Sept. 3, 1963 F. M. FREIMANN ETAL 3,102,605

SOUND REPRODUCING SYSTEM

Filed July 5, 1960

INVENTOR.
FRANK M. FREIMANN and
DANIEL R. GRAEF
BY
Lockwood, Woodard, Smith & Weikart
ATTORNEYS 3,102,605

SOUND REPRODUCING SYSTEM

Frank M. Freimann and Daniel R. Graef, Fort Wayne, Ind., assignors to The Magnavox Company, Fort Wayne, Ind., a corporation Filed July 5, 1960, Ser. No. 40,599
3 Claims. (Cl. 181—31)

This invention relates generally to sound reproduction systems and more particularly to housing structures for loud speakers wherein a plurality of loud speakers are housed within a single cabinet.

Conventional cabinets for stereophonic or binaural reproduction of sound not only include a substantial number of loud speakers but also have compartments for supporting amplifier chassis, radio receiver chassis, a record changer, record storage facilities and sometimes a television receiver chassis. Such cabinets are closed on all sides including the rear side particularly for the purpose of preventing accidental contact with relatively high voltage apparatus by unskilled persons. As a result, the space surrounding the rear surfaces of the loud speakers is relatively limited. This presents problems with reference to faithful reproduction of the lower frequencies of the audible range. Unless there is a certain minimum air volume within an enclosure for speakers reproducing these lower frequencies, excessive air pressure limits the response of the loud speakers to such an extent that faithful reproduction of such lower frequencies is not possible.

Accordingly, the principal object of this invention is to provide in cabinets having a multiplicity of loud speakers sufficient air volume within the enclosures surrounding said speakers to improve sound reproduction in the lower frequency range.

In accordance with this invention there is provided a cabinet for sound reproduction apparatus comprising spaced enclosures for housing loud speakers, and a tunnel between said enclosures for providing an air path between said enclosures and increasing the over-all air volume of said enclosures.

The full nature of the invention will be understood from the accompanying drawings and the following description and claims:

Figure 1:
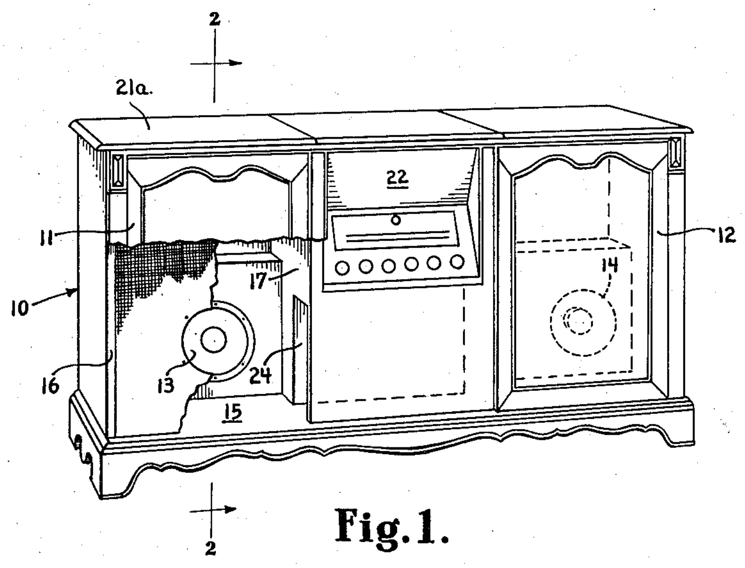
FIG. 1 is a perspective view of a cabinet with parts broken away and illustrating this invention.
Figure 2:
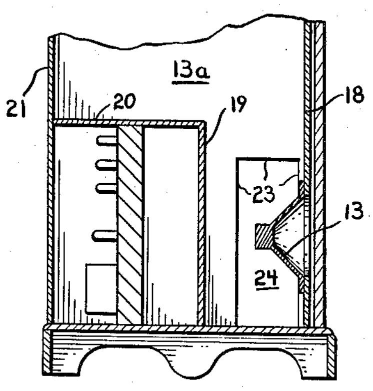
FIG. 2 is a partial cross section taken on line 2—2 of FIG. 1.

This invention comprises a cabinet 10 having conventional outer wall structure and doors 11 and 12 behind which may be supported a plurality of loud speakers 13 and 14. It will be understood that while only two speakers are illustrated herein, a plurality of speakers may be located behind each of the doors 11 and 12. It is customary to provide from two to six different speakers in the compartments behind each of the doors in order to reproduce sound within the entire audible frequency range.

The loud speakers 13 and 14 are intended to reproduce frequencies in a range from 30 cycles per second to 1000 cycles per second, for example. Speakers 13 and 14 are each within an enclosure or compartment such, for example, as enclosure 13*a* formed by the walls 15, 16, 17, 18, 19, 20, 21 and 21*a*. Speaker 14 may be enclosed in a compartment identical to 13*a*. It is well known that lour speakers having large diaphragms for reproduction of relatively low frequencies create substantial variations of air pressure within the enclosures surrounding them. Unless the enclosure is greater than a certain minimum size these changes of air pressure prevent faithful reproduction of low frequencies.

The cabinet 10 also includes a central compartment indicated generally at 22 for enclosing a radio receiver and an automatic record changer. Thus, this portion of the cabinet interior is not available to relieve air pressures created within the compartments surrounding speakers 13 and 14. In order to increase the effective air volume of these compartments there is provided a plurality of walls 23 which combined with 15 form a tunnel 24 connecting the speaker compartments. This tunnel has the effect of combining the enclosures surrounding the speakers and results in doubling the volume of the enclosure surrounding each one of the speakers 13 and 14. This is found to provide substantial improvement in sound reproduction with respect to the relatively low frequency band.

The foregoing cabinet structure improves sound reproduction for both monaural and binaural sound reproducing systems. In the case of a monaural system each loud speaker may have a different free air resonance point, one at 25 cycles, for example, and one at 35 cycles. When the speakers are mounted in a cabinet the speaker resonant points have a tendency to rise but tunnel 24 has the opposite tendency to reduce the resonance points, because the tunnel has the effect of increasing the size of the cabinet in respect to each loud speaker. It is particularly advantageous that the resonance points of the speakers differ so that one speaker may become predominant at frequencies approaching the resonance point. When this occurs, the space in the rear of both speakers, in effect, is associated wtih the predominant speaker. On the other hand if both speakers have the same resonance points, air pressures within the separate speaker enclosures increase and decrease simultaneously so that each speaker enclosure is, in effect, associated only with its own respective speaker.

For binaural reproduction of sound the signal of any given frequency fed to one speaker is always of higher amplitude than that fed to the other speaker. Consequently, the pressure caused by one speaker at any given instant is either less or greater than that caused by the other speaker. Therefore, one of the speakers is always predominant as in the case of monaural reproduction of sound, and the space in both enclosures is, in effect, associated with the predominant speaker.

This invention makes it possible to provide a speaker system which includes two separate sets of speakers for reproducing binaural or stereophonic sound, the two sets of speakers being separated sufficiently to provide the binaural or stereophonic effect without creating the necessity of a cabinet of excessively large size. If there were no size limitation in respect to the cabinet, it would be possible to make each of the speaker enclosures sufficiently large to provide faithful sound reproduction. This invention has the effect of making possible highly satisfactory binaural sound reproduction without the provision of an exceedingly large cabinet.

The invention claimed is:

1. A sound reproducing system comprising a cabinet, spaced walls dividing said cabinet into at least two spaced enclosures, said enclosures forming chambers closed to the atmosphere outside of said cabinet, a loud speaker mounted in each enclosure, the resonant point of one speaker being greater than that of the other, and wall structure between said enclosures forming a tunnel connecting said enclosures and having a cross-sectional area smaller than that of said enclosures, whereby one speaker predominates over the other speaker at any given signal frequency to, in effect, associate both speaker enclosures with the predominant speaker.

2. A cabinet for sound reproduction apparatus comprising spaced enclosures, said enclosures forming chambers closed to the atmosphere outside of said cabinet, a loud speaker in each of said enclosures for reproduction of sound at the lower end of the audio frequency spectrum, one of said loud speakers having a different free air resonant point from that of the other whereby one of said speakers becomes predominant at any given signal frequency, and means forming a tunnel between said enclosures for providing an air path between said enclosures and increasing the over-all air volume of each of said enclosures, said tunnel having a cross-sectional area smaller than that of said enclosures.

3. A sound reproducing system comprising: a unitary cabinet having a central compartment for housing the amplifier portions of said system, and a pair of enclosures one on either side of said central compartment, said enclosures forming chambers closed to the atmosphere outside said cabinet; a loudspeaker mounted in each said enclosure, the resonant point of one speaker being greater than that of the other; and means in said central compartment forming a tunnel connecting said enclosures, said tunnel having a cross-sectional area smaller than that of said enclosures; whereby one speaker predominates over the other speaker at any given signal frequency to, in effect, associate both speaker enclosures with the predominant speaker.

References Cited in the file of this patent

UNITED STATES PATENTS

| | | |
|---|---|---|
| 2,262,179 | Hammond | Nov. 11, 1941 |
| 2,872,516 | Hoffman | Feb. 3, 1959 |

FOREIGN PATENTS

| | | |
|---|---|---|
| 19,687/34 | Australia | June 21, 1935 |
| 721,732 | Germany | June 16, 1942 |
| 1,005,731 | France | Jan. 2, 1952 |
| 73,672 | Denmark | Jan. 7, 1952 |